(12) United States Patent
Meunier et al.

(10) Patent No.: US 6,681,369 B2
(45) Date of Patent: Jan. 20, 2004

(54) SYSTEM FOR PROVIDING DOCUMENT CHANGE INFORMATION FOR A COMMUNITY OF USERS

(75) Inventors: Jean-Luc Meunier, Saint Nazaire les Eymes (FR); Damian Arregui, Grenoble (FR); Natalie S. Glance, Meylan (FR)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/305,845

(22) Filed: May 5, 1999

(65) Prior Publication Data
US 2003/0167443 A1 Sep. 4, 2003

(51) Int. Cl.⁷ ............................ G06F 17/30; G06F 17/21
(52) U.S. Cl. ........................ 715/511; 707/3; 707/203
(58) Field of Search ........................ 707/511, 3, 5, 707/203; 715/511, 501.1

(56) References Cited

U.S. PATENT DOCUMENTS

| | | | |
|---|---|---|---|
| 4,996,642 A | * 2/1991 | Hey | 705/27 |
| 5,704,017 A | 12/1997 | Heckerman et al. | 395/61 |
| 5,724,567 A | 3/1998 | Rose et al. | 395/602 |
| 5,799,318 A | 8/1998 | Cardinal et al. | 707/104 |
| 5,884,282 A | * 3/1999 | Robinson | 705/27 |
| 5,899,995 A | * 5/1999 | Millier et al. | 707/102 |
| 6,055,570 A | 4/2000 | Nielsen | 709/224 |
| 6,064,980 A | * 5/2000 | Jacobi et al. | 705/26 |
| 6,219,818 B1 | * 4/2001 | Freivald et al. | 707/1 |
| 6,236,975 B1 | * 5/2001 | Boe et al. | 705/10 |
| 6,249,795 B1 | * 6/2001 | Douglis | 707/511 |
| 6,272,531 B1 | * 8/2001 | Shrader | 709/206 |
| 6,289,353 B1 | * 9/2001 | Hazlehurst et al. | 707/101 |
| 6,304,864 B1 | * 10/2001 | Liddy et al. | 706/15 |
| 6,308,175 B1 | * 10/2001 | Lang et al. | 707/10 |
| 6,314,420 B1 | * 11/2001 | Lang et al. | 707/3 |
| 6,347,313 B1 | * 2/2002 | Ma et al. | 707/3 |
| 6,356,879 B2 | * 3/2002 | Aggarwal et al. | 705/26 |
| 6,362,837 B1 | * 3/2002 | Ginn | 345/751 |
| 6,366,933 B1 | * 4/2002 | Ball et al. | 707/511 |
| 6,487,541 B1 | * 11/2002 | Aggarwal et al. | 705/26 |
| 6,557,042 B1 | * 4/2003 | He et al. | |

FOREIGN PATENT DOCUMENTS

WO  WO 9840832 A2 * 9/1998 .......... G06F/17/30

OTHER PUBLICATIONS

European Search Report, Application No. EP 00303621.7, dated Feb. 22, 2002.
Falk, A., et al.: "PAWS: An Agent for WWW–Retrieval and Filtering", Proceedings of the International Conference on the Practical Application of Intelligent Agents and Multi-Agent Technology, Apr. 22, 1996, pp. 169–179, XP002037595.
Douglas, F., et al.: "The AT&T Internet Difference Engine: Tracking and Viewing Changes on the Web", AT&T Labs—Research Technical Report #97.23.1, Apr. 14, 1997, XP002135690.

(List continued on next page.)

Primary Examiner—Sanjiv Shah

(57) ABSTRACT

A document recommendation system incorporating a document change monitoring agent. For a document recommendation system to be effective, it is desirable to enable users to be cognizant of changes that may occur to the document. The present invention addresses this issue by coupling a document change monitoring agent, which automatically detects changes in referenced documents, with a recommender system, which helps users share and evaluate information in a collaborative way. One advantage of the invention is that it brings human judgement into the relevance evaluation of the detected changes and allows the results to be shared with other people likely to be interested, in such a way that redundant work is decreased. Another advantage of the invention is that it enables Systems Administrators of a document recommendation system to be more efficient in the management of the system.

20 Claims, 5 Drawing Sheets

OTHER PUBLICATIONS

Bieber, M., et al.: "Fourth Generation Hypermedia: Some Missing Links for the World Wide Web", International Journal of Human–Computer Studies, Academic Press, New York, NY., US, vol. 47, No. 1, Jul. 1997, pp. 31–65, XP002101194, ISSN: 1071–5819, p. 47, line 4—p. 49, line 33.

Glance, N., Arregui, D. and Dardenne, M., "Knowledge Pump: Supporting the Flow and Use of Knowledge", in Information Technology for Knowledge Management, Eds. U. Borghoff and R. Pareschi, New York: Springer–Verlag, pp. 35–45, 1998.

Glance, N., Arregui, D. and Dardenne, M., "Making Recommender Systems Work for Organizations", in Proceedings of PAAM'99, Apr. 1999.

Resnick et al., "GroupLens: An Open Architecture for Collaborative Filtering of Netnews", in Proceedings of the ACM 1994 Conference on Computer Supported Cooperative Work, Chapel Hill, NC, pp. 175–186, 1994.

Shardanand et al., "Social Information Filtering: Algorithms for Automating Word of Mouth", in Proceedings of the ACM 1995 Conference on Computer Human Interactions, Denver, CO, 1995, pp. 210–217.

Ken Fishkin, and Eric A. Bier, "WebTracker a Web Service for Tracking Documents", in World Wide Web Conference 6 (WWW6), Santa Clara, CA, 1997 (available on the Internet at http://decweb.ethz.ch/WWW6/Posters/768/768_WEBT.HTM).

Erik ESPE, "NetMind focuses on corporate clients, Internet firm shifts from online advertising to selling software", Silicon Valley/San Jose Business Journal, Oct. 2, 1998 (available on the Internet at http://sanjose.bizjournals.com/sanjose/stories/1998/10/05/smallb1.html?txprintable).

Kenichi Kamiya, Martin Röscheisen, and Terry Winograd, "Grassroots: A System Providing a Uniform Framework for Communicating, Structuring, Sharing Information, and Organizing People", in Proceedings of the 6th WWW conference, Paris, 1996 (available on the Internet at http://www–pcd.stanford.edu/Grassroots/WWW96/).

First Floor, INC., Corporate Background, Index of/computershop/prod96 (available on the Internet at:http://www.212.net/computershop/prod96/frfl_cb.htm) 1996.

Frist Floor, INC., Smart Bookmarks 2.0 (available on the Internet at: http:www.212.net/computershop/prod96/frfl_sb.htm) 1996.

* cited by examiner

SYSTEM FOR PROVIDING DOCUMENT CHANGE INFORMATION FOR A COMMUNITY OF USERS

FIELD OF THE INVENTION

The present invention is related to the field of information retrieval, and in particular to the field of providing document change information to a user.

BACKGROUND OF THE INVENTION

The ever-increasing universe of electronic information, for example as found on the World Wide Web (herein after referred to as the Web), competes for the effectively fixed and limited attention of people. Both consumers and producers of information want to understand what kinds of information are available, how desirable it is, and how its content and use change through time.

Making sense of very large collections of linked documents and foraging for information in such environments is difficult without specialized aids. Collections of linked documents are often connected together using hypertext links. The basic structure of linked hypertext is designed to promote the process of browsing from one document to another along hypertext links, which is unfortunately very slow and inefficient when hypertext collections become very large and heterogeneous. Two sorts of aids have evolved in such situations. The first are structures or tools that abstract and cluster information in some form of classification system. Examples of such would be library card catalogs and the Yahoo! Web site (URL http://www.yahoo.com). The second are systems that attempt to predict the information relevant to a user's needs and to order the presentation of information accordingly. Examples would include search engines such as Lycos (URL: http://www.lycos.com), which take a user's specifications of an information need, in the form of words and phrases, and return ranked lists of documents that are predicted to be relevant to the user's need.

Another class of tools is recommender systems. Recommender systems provide a list of recommended subsequent web pages worth viewing based on some predetermined filtering criteria. One such recommender tool is the "Recommend" feature provided on the Alexa Internet Web site (URL: http://www.alexa.com). The "Recommend" feature provides a list of related Web pages that a user may want to retrieve and view based on the Web page that they are currently viewing.

Another recommender system is termed "the Knowledge Pump" and is described by Glance, N., Arregui, D. and Dardenne, M. "Knowledge Pump: Supporting the Flow and Use of Knowledge." In *Information Technology for Knowledge Management*. Eds. U. Borghoff and R. Pareschi, New York: Springer-Verlag, pp. 35–45, 1998. The "Knowledge Pump" was designed for use within organizations and has a key focus on the sharing of information in the form of documents.

Prospective applications of recommender systems are as information sharing applications for organizations. Here, the quality of the recommendation service is key. If the recommender system fails to recognize stale references and changes in recommended documents, the users' experience of the information sharing environment will suffer significantly as a result. In other words, a main failing of recommender systems currently is that they provide static recommendations of potentially dynamic objects.

Changes to documents are also of interest to users. Such changes can take many forms: substantive content change, cosmetic/syntactic changes, and disappearance of the document. In addition, administrators of data stores containing document references face the additional problem that the same document can be referenced by multiple references.

Some repositories and databases are equipped with tools, using triggers, that help users deal with these problems by notifying users when referenced items of interest change in some way or are removed. On the WWW, there are now also several services available to help users monitor Web pages based on their Uniform Resource Locator (URL) address, such as: netmind, Smart Bookmarks, Grassroots, "WebTracker—a Web Service for tracking documents" by Fishkin, K. and Bier, E.

netmind: http://www.netmind.com,
Smart Bookmarks: http://www.firstfloor.com/SmartBookmarks2.0/QuickStart.html,
Grassroots: http://www-pcd.stanford.edu/Grassroots,
"WebTracker—a Web Service for tracking documents," by Fishkin, K. and Bier, E. available at http://www.parc.xerox.com/istl/members/fishkin/doc/webtracker.html.

These services notify users when URLs they have registered with the service have changed in some way. In addition, they may also be able to federate the change monitoring systems of other kinds of networked repositories. However, evaluating the nature of the change and its importance for the user is a difficult task to automate and is thus the weakness of such change monitoring systems. The agent notifications while perhaps including a great deal of data concerning the change, may be potentially irrelevant to the user, and in the long run, the high noise vs. signal ratio may cause the user more annoyance than aid. The most accurate way to evaluate the nature and importance the change remains the user him/herself, at least for the foreseeable future.

In addition, within a given workgroup, work community, or organization, it is likely that the existence of substantive changes in a document will be relevant to a number of people, not just one. In this case, the work of evaluating the nature of the change is likely to be done not once but many times, as there is currently no good way to share this work.

SUMMARY OF THE INVENTION

A document recommendation system incorporating a document change monitoring agent is disclosed. As described above with respect to the prior art, there are a number of problems that are experienced by users of networked repositories. The present invention addresses several that stem from the fact that access to these repositories is typically done via document references that point to documents. The problems that arise are: (1) the document reference itself may not remain stable (may become stale); (2) the content of document referenced may change; and (3) multiple references may exist for the same item. Solutions that exist today, such as document change monitoring agents on the World Wide Web and change trigger agents within repositories and databases, are entirely automated processes, and as such, do not resolve these problems satisfactorily. In addition, they are oriented to single users as opposed to groups of users.

The present invention addresses these issues by coupling a document change monitoring agent, which automatically detects changes in referenced documents, with a recommender system, which helps users share and evaluate information in a collaborative way. An important advantage of the present invention is that it brings human judgement into the relevance evaluation of the detected changes and allows the results to be shared with other people likely to be interested, in such a way that redundant work is decreased.

The present invention shows how this limitation can be overcome by, first of all, coupling a document change monitoring agent with the recommender system and, secondly, implementing a collaborative process for evaluating the nature and importance of these changes. It has been determined through research and experience with existing recommender systems, that such functionality is key to improving the usability of a recommender system intended for sharing information in the form of documents.

A system implementation of the present invention may include the following elements: a document recommendation element for providing document recommendations to a user based on a user profile, said document recommendation element further comprising one or more action elements for responding to a change in a recommended document, each of said one or more action elements performing a different action based on the nature of said change; document representation storage, for storing representations of said recommended documents; a document registration element coupled to said document recommendation element, said document registration element for enabling a user to identify recommended documents for which they would like to be notified of changes; a document change monitoring element coupled to said document registration element, said document change monitoring element for detecting a change to said document and reporting said change to said document recommendation element; and a user notification element coupled to said document recommendation element, said user notification element for notifying users of said change.

DETAILED DESCRIPTION OF THE INVENTION

Figure 1:
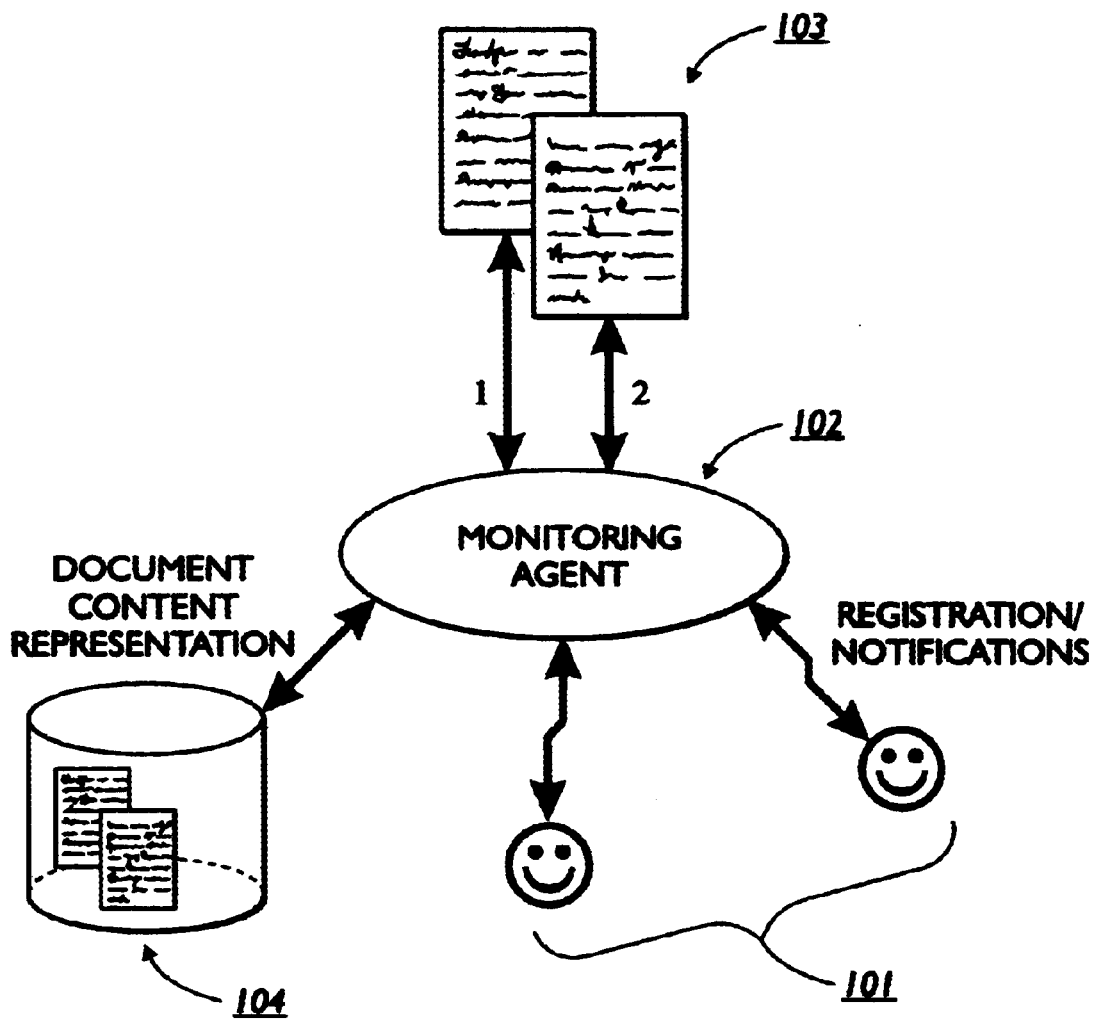
FIG. 1 is a block diagram of a change monitoring agent as is currently known in the prior art FIG. 2 a block diagram of a recommender system as is currently known in the prior art.

A system for providing document change information to a community of users having an interest in the document is disclosed. The system provides for collaborative mechanism for user to share feedback about such changes. The currently preferred embodiment of the present invention is implemented for analyzing collections of linked documents (i.e. Web Pages) residing on the portion of the Internet known as the World Wide Web (hereinafter the Web). The Web is the portion of the Internet that is used to store and access linked documents. A Web page may have multi-media content as well as relative and absolute links to other pages. A Web page is accessed by its Uniform Address Locator (URL) address. A Web Site is a collection of related Web pages associated with an entity having a presence on the World Wide Web such as a company, educational institute or the like. A repository (or source/document repository) is a Web location containing collections of documents which may be accessed via the Web.

A Web Browser is a tool which enables a user to traverse through and view documents residing on the Web. Other rendering means associated with the Browser will permit listening to audio portions of a document or viewing video or image portions of a document. Examples of commercially available Web Browsers include Netscape Navigator®, available from Netscape Communications Corporation, and Internet Explorer, available from the Microsoft® Corporation.

Overview of the Present Invention

In the present invention a document change monitoring agent is coupled with a recommender system for three main purposes: (1) to more effectively evaluate the nature and importance of changes in referenced documents; (2) to share such results among a community of users; and (3) to help administrators better manage data stores containing document references (e.g., the data store associated with a recommender system).

The document change monitoring agent, as described in detail below, is responsible for tracking changes in referenced documents. Its main components, with respect to this invention, are data storage for storing representations of the document content and a function for evaluating the extent and character of the change. Such document change monitoring agents exist already on the Web (as described in the prior art) and have also been instantiated as triggers within databases. Added to the document change monitoring agent is means to share information with the second module, the recommender system.

A recommender system is a system that enables users to share recommendations in a way that limits information overload. An important component of the recommender system is a filtering mechanism that, for each user, ranks or rates the priority of recommended items coming from others. In the present invention, we are concerned only with recommender systems that handle recommendations of pointers to items (as opposed to the items themselves).

By coupling the document change monitoring agent with a recommender system, users who have recommended items which have since changed can be notified of that change, if they so desire. The recommender system is extended to provide users with the means to evaluate the nature and importance of the change. This evaluation can then be shared with other users of the recommender system, using the filtering mechanisms that already exist.

Thus, the present invention, on the one hand, augments the automatic process of monitoring document changes with human evaluation, and on the other hand, limits the amount of redundant evaluation work that goes on by sharing the results of the evaluation with those other people most likely to be interested.

Finally, a number of side benefits ensue from the perspective of administrators of the recommender system (or other data store connected to the combined system): (1) the administrator is notified when pointers become stale; (2) the administrator is notified when two or more references point to the same document; (3) the administrator is notified when the reference itself has changed; and (3) the administrator is notified when it is likely that access to a particular repository is no longer possible, i.e., when that repository has been disconnected from the network.

Described in more detail below are both document change monitoring agents and recommender systems as they exist today, and additionally a characterization of the nature of the source repositories alongside which these operate. Then discussed in greater depth is the invention and manner for coupling of the change monitoring agent and the recommender system in order to resolve the problems discussed above. Finally, discussed are the changes required in both the document change monitoring agent and in a recommender system in order to implement the present along with explicit specifications for both.

Document Change Monitoring Agent

FIG. 1 illustrates a document change monitoring agent as known in the prior art. A document change monitoring agent provides a means to track changes in online documents and to notify interested people about the change. Document monitoring involves three steps which are illustrated with reference to FIG. 1.

Step 1 User Document Registration and Interest Specification: The user 101 registers with the monitoring agent 102 the identifier of the online document 103 (for agents operating on the Web, this is typically the URL of the document). Additionally some agents permit the definition of: i) a region to monitor in the document, ii) a list of keywords that represent the user interest, iii) the periodicity of the check the agent will perform.

Step 2 Monitoring Agent Monitors Document(s): The monitoring agent 102 monitors document changes by periodically accessing the document or, alternatively, by requiring a notification service from the document repository. The latter case is less common, since i) document repositories often do not offer this service, ii) the added value of the agent resides then mainly in the federation of several repositories for monitoring changes. In the former case, the monitoring agent 102 is responsible for detecting the change and therefore associates with the document identifier a record of information representing the state of the document. Such information is stored in document content representation storage 104. The monitoring agent 102 detects changes by comparing successive records. The information recorded may range from the whole document content to a document content checksum of only a few bytes. The relevance and efficiency of the change detection derives directly from the sort of record(s) (or combination thereof) that is used.

Step 3 Monitoring Agent Notification To User: The monitoring agent 102 notifies the user 101 about the change, typically by sending an email describing the detected change. Here again, the description of the change can range from a detailed textual comparison to an almost empty message notifying the occurrence of the change, depending on which kind of records were kept for the document.

Recommender Systems

Figure 2:
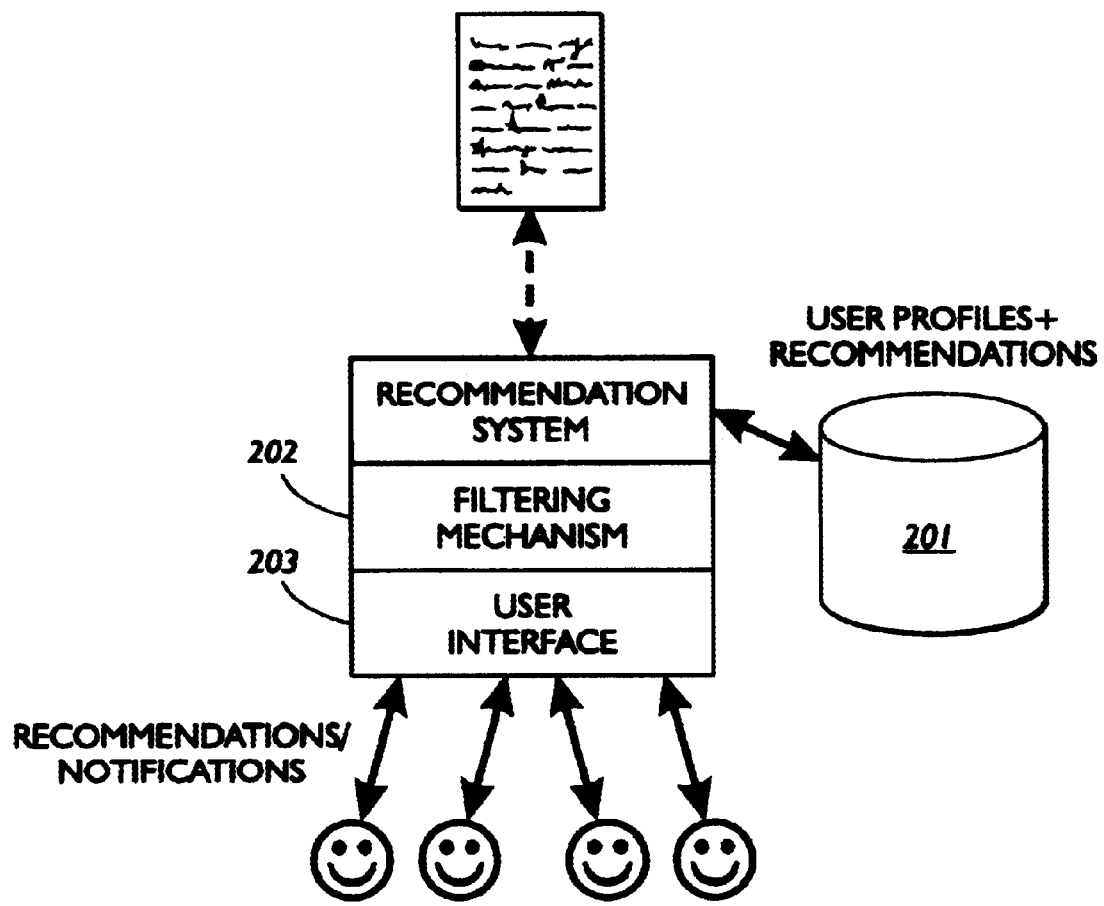

FIG. 2 is a block diagram illustrating a recommender system as is known in the prior art. A recommender system uses filtering techniques to provide personalized recommendations of documents to individual users. Referring to FIG. 2, the minimal set of features common to any recommender system is:

Data storage 201, which supports at least the following three data structures:
User: personal and profiling information for a member of the system.
Document: reference to a document (typically a URL).
Review: associates a user, a document and a numerical score (rating).

A filtering mechanism 202 which ranks or rates recommended items for any given user, based on the user's profile (which can contain the user's history of interaction with the system, keywords). Common filtering approaches include automated collaborative filtering and personalized content filtering, which are described in greater detail in the following references: Resnick et al. "GroupLens: An Open Architecture for Collaborative Filtering of Netnews." *Proceedings of the ACM* 1994 *Conference on Computer Supported Cooperative Work*, Chapel Hill, N.C., 199', pp. 175–186; and Shardanand et al. Social Information Filtering: Algorithms for Automating Word of Mouth. *Proceedings of the ACM* 1995 *Conference on Computer Human Interactions*, Denver, Colo., 1995, pp. 210–217.

A User interface 203 providing an interface for displaying recommended items to a user based on predicted preferences; an interface for the user to provide feedback on recommended items; an interface for allowing the user to recommend new items. It should be noted that design of such user interfaces are well known in the art, and thus could be implemented using such known technology. Thus, no further discussion on the creation of the user interfaces is deemed necessary.

Source Repositories

Source repositories are defined here as any repository that can serve as a source of recommendations (of documents). One principle example is the Web, in which every document is referenced by a URL. Other examples include networked databases and document management systems. Accessing a source repository via a reference and the appropriate communication channel can result in three different results:

1. The document is accessed without problems;
2. The reference is no longer valid (for example, a URL that points to a page that no longer exists);
3. The source repository is not responding (for example, the HTTP server upon which the source repository resides and may be down or taken off the network).

Coupling a Document Change Monitoring Agent with a Recommender System

Figure 3:
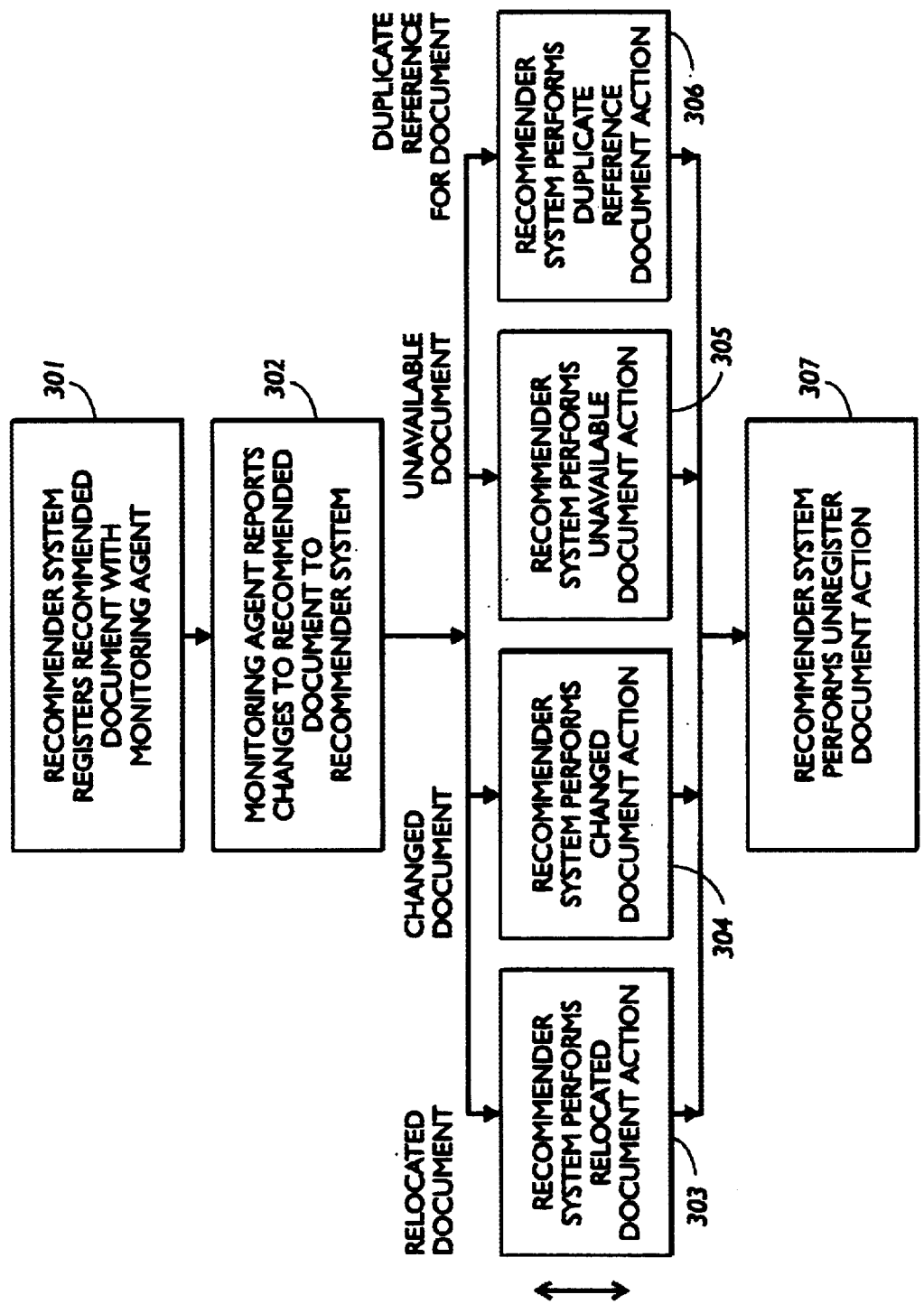
FIG. 3 is a flowchart illustrating the steps for coupling a change monitoring agent with a recommender system as may be performed in the currently preferred embodiment of the present invention.

A method to couple a document change monitoring agent and recommender systems that solves the problems described above is described with reference to the flowchart of FIG. 3. First, the recommender system registers the recommended document to the monitoring agent, step 301. This will in turn will monitor changes occurring to the document.

The monitoring agent reports to the recommender system any change (change in content or location as well as disappearance of document) occurring to the document, step 302. The monitoring agent also detects multiple registered documents having the same content and reports about these duplicates.

Responsive to these reports, the recommender system reacts and takes action to the reports as followed:

Step 303, for relocated documents, it stores the new location of the document, registers that new location to the agent and unregisters the previous one.

Step 304, for documents whose content has changed, it notifies users implicated by the change (i.e. users having shown interest for the recommended document and the document submitter, if any). These users are given the possibility to annotate again the document or to comment on the change. Each user's evaluation of the change is made available to the others, as well as to the membership of the recommender system when they subsequently receive/access/review the recommendation.

Step 305, for unavailable documents, it shows on the display that the document is no longer available and possibly notifies the system administrator or the user who recommended the document.

Step 306, for duplicate references to the same document, the recommender system updates its representation of the document to track the multiple references.

Based on user requests responsive to their review of community feedback relating to the change, the recommender system might unregister a document from the change monitoring agent, step 307.

Figure 4:
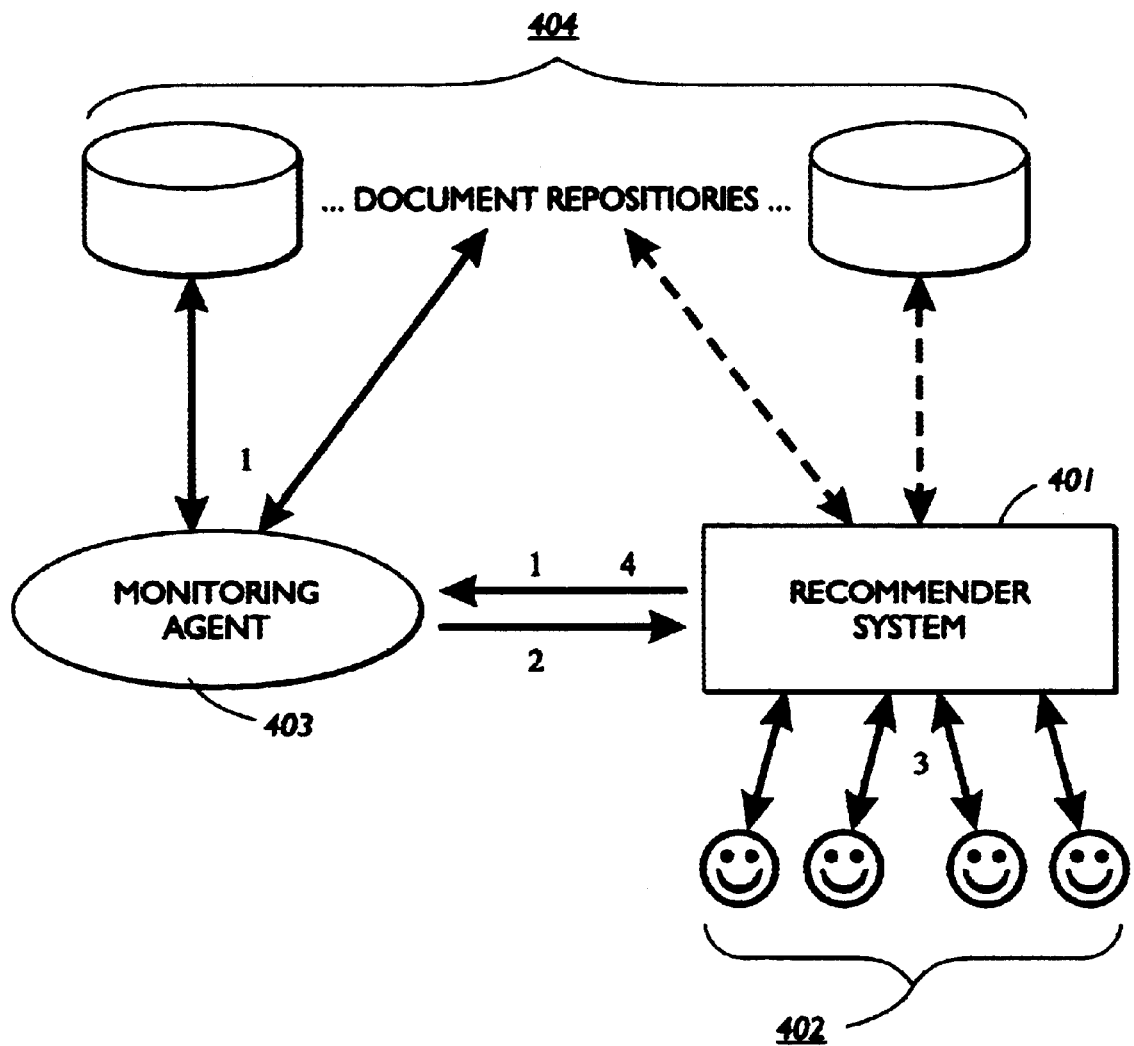
FIG. 4 is a block diagram further illustrating the interactions between the change monitoring agent, the recommender system, the users and the document repositories as may be performed in the currently preferred embodiment of the present invention.

FIG. 4 further illustrates the interactions between the agent, the recommender system, the users and the document repositories. Referring to FIG. 4, the recommender system 401 will provide recommended documents to users 402. To perform this function, the recommender system 401 interacts with the document repositories 404. The document repositories 404 will typically reside on the Web. In any event, the users 402 may then elect to be informed about changes to the recommended documents. When this occurs, recommender system 401 registers the recommended documents with monitoring agent 403. Upon detecting a document change, the monitoring agent 403 reports back to the recommender system 401 information about the change. The recommender system 401 then notifies the users 402 of the change. The user may then provide feedback related to the change.

The method of the present invention solves the problems cited above in the following ways:

- Dynamic documents (i.e. subject to changes) are handled gracefully; users are given the possibility to review collaboratively the detected changes and to modify their recommendation accordingly.
- Importance of changes is collaboratively evaluated in the frame of the recommender system.
- Multiple persons no longer need to same effort/work to assess the value of the change, and in particular, insignificant changes need only be identified once.
- Broken links (open or heterogeneous systems) are detected by the agent, reported to the recommender system, which in turn is given the possibility to react appropriately.
- Multiple entries having the same content are detected by the agent, reported to the recommender system, which in turn is given the possibility to react appropriately.

Monitoring Agent: Specification

Provided herein is an example, a specification of a monitoring agent (which does not include either the management of broken links, of relocated documents, or of multiple entries).

The agent as described below runs independently from the recommender system. At regular interval it invokes its own DoMonitoring( ) method. It should provide some data storage capabilities (however this job could be taken over by the recommender system) and should export and Application Programming Interface (API). The basic persistent data structure at this level is the Monitor. One can understand coupling as accessing and manipulating monitors through the API both by the monitoring agent and the recommender system.

Monitor:
  Document
    Reference to a document's content.
  LastModified
    Last date and time the document has been found modified. Initially Unknown.
  Status
    Ok if the document's content has been accessed without problems, Error otherwise. Initially Ok.
  Characteristic
    Value computed using the document's content, see the private methods of the agent provided below. Initially its value equals to None.
  Subscribers
    List of users interested in being aware of the changes for this particular document. Initially Unknown.

API Methods:
For Managing the Monitors:
  Monitor(Document, User)
    Creates a new monitor for a document with a first subscriber.
  GetMonitors( )
    Returns all stored monitors.
  GetMonitor(Document)
    Returns the monitor for a document or None if there is not such a monitor.
  AddMonitor(Monitor)
    Adds a monitor.
  RemoveMonitor(Monitor)
    Removes a monitor.
  UpdateMonitor(Monitor)
    Updates the attributes of an existing monitor.

For Executing the Monitoring Process:

```
DoMonitoring( ):
    mons = GetMonitors( )
    for m in mons:
        d = m.Document
        (sc, c) = FetchContent(d)
        if (sc = Ok):
            pc = Parse(c)
            m.Status = Ok
            if m.Characteristic = None:
                m.Characteristic = Characterize(pc)
            else:
                old = m.Characteristic
                new = Characterize(pc)
                if (not Compare(old, new)):
                    m.LastModified = Now( )
                    m.Characteristic = new
        else:
            m.LastModified = Now( )
            m.Status = Error
        UpdateMonitor(m)
```

Private Methods for Monitor Agent:
FetchContent(Document)
  Retrieves a document's content (using its URL for example) from a source repository, returns a tuple (StatusCode, Content). The result is reported via a StatusCode returned by the FetchDocument private method of the monitoring agent, which can have three possible values:
    Ok: Document accessed without problems.
    DeprecatedReference: Reference is no longer valid (for example URL pointing to a page that doesn't exist any longer).

AccessFailure: Major problem, the source repository is not responding (an HTTP server may be down, for example).
Now( )
   Returns the current date and time.
Parse(Content)
   Parses the content. For example, removing all punctuation and HTML mark-ups. Returns parsed-content.
Characterize(Parsed-Content)
   Returns a value that will remain the same if the document's content remains unchanged. For example, the returned value might be generated by a hashcode function.
Compare(Characteristic, Characteristic)
   Compares two characteristics produced by the Characterize method and returns True if they are considered to be similar enough, False otherwise. A threshold value will probably be involved in the implementation.
Recommender System: Minimal Additional Requirements
   The recommender system of the currently preferred embodiment builds upon existing systems. Such systems would provide the capabilities described above (e.g. a filtering mechanism and various user interfaces for enabling the user to interact with the system). To couple the recommender system with the specified monitoring agent requires at least:
   (1) A way for the recommender system to subscribe references to be monitored to the monitoring agent; see the Subscribe(Document d, User u) method below.
   (2) A way to periodically ask for, or to be notified of, the list of changes the monitoring agent has detected; see the CheckDocuments( ) method below.
   (3) A way to allow users of the recommender system to turn monitoring on and off for any particular reference; e.g., a unSubscribe(Document d, User u) method.
   (4) A way to notify the user that the content has changed (after suitable filtering) and propose one of several actions, e.g., evaluate (review) the change, ignore, stop monitoring, advise deletion of reference from data store of recommender system; see the NotifyUser(Monitor m, User s) method below.
   (5) A way to notify the administrator when the reference is unavailable over a long period of time (one week, say); see the NotifyAdmin(Monitor m) below.
   Specifically, the recommender system will at regular intervals invokes its own CheckDocuments( ) method. The time of last invocation is stored in the LastCheck attribute and a reference to the monitoring agent is kept in the MonitoringAgent attribute.
   In the reviewing interface one additional option is provided, Subscribe, which turns monitoring on (or off) for the particular reference.

```
Subscribe(Document d, User u):
    m = MonitoringAgent.GetMonitor(d)
    if (m = None):
        m = new Monitor(d,u)
        MonitoringAgent.UpdateMonitor(m)
    Else:
        m.Subscribers.add(u)
        MonitoringAgent.UpdateMonitor(m)
        MonitoringAgent.AddMonitor(m)
CheckDocuments( ):
    mons = MonitoringAgent.GetMonitors( )
    for m in mons:
        if (m.LastModified > LastCheck):
            if m.Status = Ok:
```

-continued

```
                for s in m.Subscribers:
                    NotifyUser(m, s)
            else:
                NotifyAdmin(m)
        LastCheck = Now( )
NotifyUser(Monitor m, User s):
    Notifies the user s that the content of the reference m.Document
has changed and proposes several options:
    Review
        Fill review about changes that will be accessible to
all the other users.
    Ignore
        Do nothing, discard the notification.
    Unsubscribe
        m.Subscribers.remove(s)
            if (m.Subscribers = [ ]):
                MonitoringAgent.RemoveMonitor(m)
            else
                MonitoringAgent.UpdateMonitor(m)
NotifyAdmin(Monitor m):
    Notifies the administrator of the recommender system that the
document corresponding to the reference m.Document is not accessible.
```

It should be noted that the monitoring agent and recommender system may execute on either the same or different computer systems. Further, a since communication is preferably through a predetermined Application Programming Interface, multiple such monitor agents may operate with a single recommender system, or multiple recommender system may operate with a single monitor agent. Implementation of such a configuration would not depart from the spirit and scope of the present invention.

Figure 5:
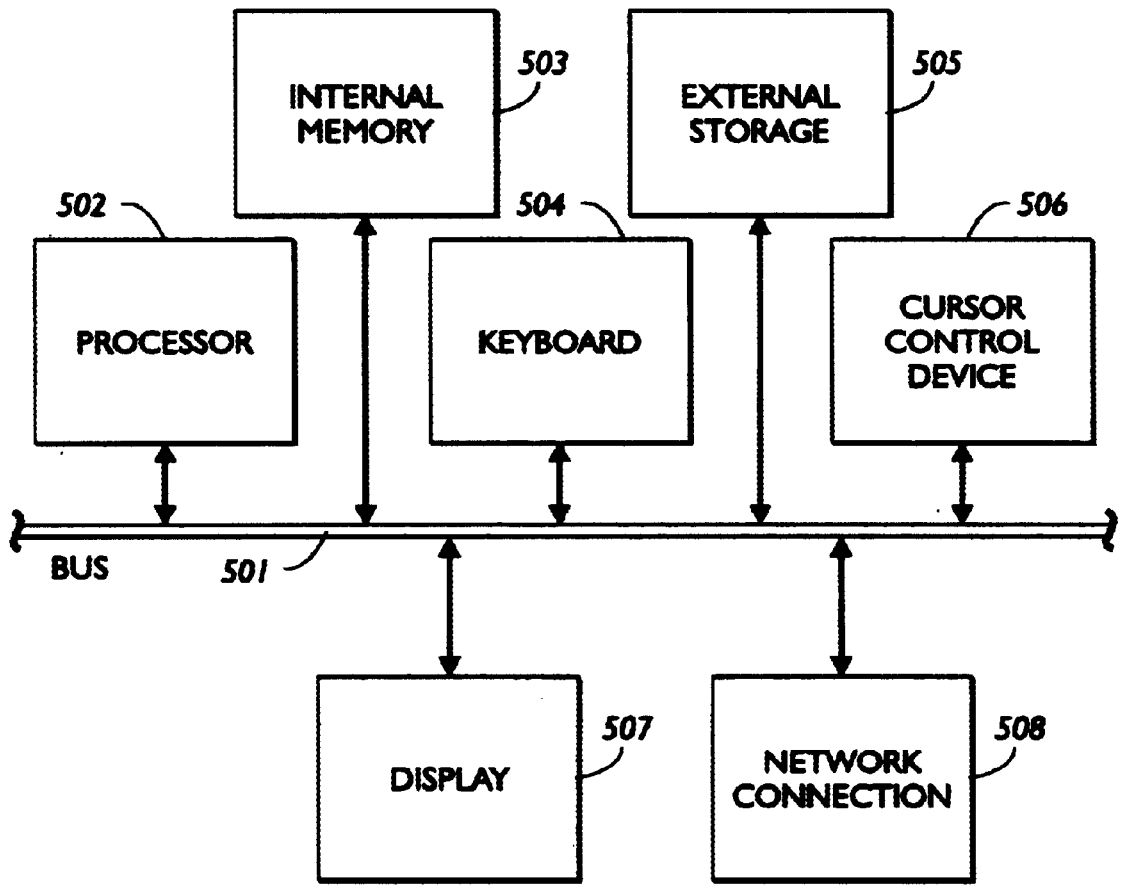
FIG. 5 is a block diagram of a computer system which may be utilized to implement the system of the currently preferred embodiment of the present invention.

Overview of a Computer Controlled Display System in the Currently Preferred Embodiment of the Present Invention The computer based system on which the currently preferred embodiment of the present invention may be implemented is described with reference to FIG. 5. As noted above, the present invention is implemented using software programming instructions for execution on a computer based system. The computer based system and associated operating instructions (e.g. software) embody circuitry used to implement the present invention. Referring to FIG. 5, the computer based system is comprised of a plurality of components coupled via a bus 501. The bus 501 may consist of a plurality of parallel buses (e.g. address, data and status buses) as well as a hierarchy of buses (e.g. a processor bus, a local bus and an I/O bus). In any event, the computer system is further comprised of a processor 502 for executing instructions provided via bus 501 from Internal memory 503 (note that the Internal memory 503 is typically a combination of Random Access and Read Only Memories). The processor 502 will be used to perform various operations in support extracting raw data from Web site, converting the raw data into the desired feature vectors and topology, usage path and text similarity matrices, categorization and spreading activation. Instructions for performing such operations are retrieved from Internal memory 503. Such operations that would be performed by the processor 502 would include the processing steps described in the flowcharts of FIG. 3 and the accompanying descriptions. The operations would typically be provided in the form of coded instructions in a suitable programming language using well-known programming techniques. The processor 502 and Internal memory 503 may be discrete components or a single integrated device such as an Application Specification Integrated Circuit (ASIC) chip.
   Also coupled to the bus 501 are a keyboard 504 for entering alphanumeric input, external storage 505 for storing data, a cursor control device 506 for manipulating a cursor, a display 507 for displaying visual output and a network connection 508. The keyboard 504 would typically be a standard QWERTY keyboard but may also be telephone like keypad. The external storage 505 may be fixed or removable magnetic or optical disk drive. The cursor control device 506, e.g. a mouse or trackball, will typically have a button or switch associated with it to which the performance of certain functions can be programmed. The network connection 508 provides means for attaching to a network, e.g. a Local Area Network (LAN) card or modem card with appropriate software. The network ultimately attached to is the Internet, but it may be through proxy servers or intermediary networks or dial-up services such as America On-Line, Prodigy® or CompuServe®.

Thus, a system for providing document change information for a community of users is disclosed. While the present invention is described with respect to a preferred embodiment, it would be apparent to one skilled in the art to practice the present invention with other configurations of digital document management systems. Such alternate embodiments would not cause departure from the spirit and scope of the present invention. For example, the currently preferred embodiment discloses two seemingly discrete systems having an application programming interface for system communication, whereas the present invention could be implemented as a single system with the document change agent being a part of the recommender system.

What is claimed is:

1. A system for providing document change information to a community of users, comprising:

a document recommendation element for providing document recommendations to each user in the community of users based on a user profile;

document representation storage, for storing representations of said recommended documents;

a document registration element coupled to said document recommendation element, said document registration element for enabling users to identify a recommended document for which they would like to be notified of changes;

a document change monitoring element coupled to said document registration element, said document change monitoring element for detecting a change to said recommended document and reporting said change, having a type, to said document recommendation element; and a user notification element coupled to said document recommendation element, said user notification element for notifying users in the community of users of said change when they registered with said document registration element to be notified of changes to said recommended document;

wherein said document recommendation element further comprises one or more action elements for responding to said change reported by said document change monitoring element; each of said one or more action elements performing a different action related to said recommended document according to the type of said change; and wherein one of said one or more action elements takes action responsive to a change in content of said recommended document, and wherein said action taken is to notify users of said recommended document of said change, to solicit feedback of said change, and to provide said feedback to other users of said recommended document in the community of users.

2. The system as recited in claim 1 wherein said feedback is made available to other users in the community of users not registered with said document registration element to be notified of changes to said recommended document upon their accessing the feedback.

3. The system as recited in claim 2 wherein one of said one or more action elements takes action responsive to a change in recommended document location, and wherein said action is to modify location information for said recommended document in said document representation storage.

4. The system as recited in claim 3 wherein one of said one or more action elements takes action responsive to a determination that said recommended document has become unavailable; and wherein said action taken is to notify a systems administrator or the user who recommended said document.

5. The system as recited in claim 3 wherein one of said one or more action elements takes action responsive to a determination that there exist duplicate references to said recommended document, and wherein said action taken is to modify location information for said recommended document in said document representation storage to reflect the multiple references.

6. The system as recited in claim 3 wherein said feedback solicited includes one of ignoring the change and stop monitoring the recommended document.

7. In a system for managing document recommendations to a community of users, said documents contained in a collection of network accessible documents, a method for providing document change information responsive to instances of change of said documents, said method comprising:

a) input from users in the community of users indicating to said system that they would like to be notified of a change to a recommended document;

b) said system registering said recommended document with a monitoring agent, said monitoring agent for detecting changes to network accessible documents;

c) said monitoring agent indicating to said system that a change to said recommended document has occurred;

d) said system taking an appropriate action according to a type of change to said recommended document;

e) said system being adapted to notify users in the community of users of said change when they registered with said document registration element to be notified of changes to said recommended document;

wherein said type of change to said recommended document is a change in content of said recommended document, and wherein said action taken is to notify users of said recommended document of said change, to solicit feedback of said change, and to provide said feedback to other users of said recommended document in the community of users.

8. The method as recited in claim 7 wherein said type of change to said recommended document is a relocation of said document and said appropriate action is to change document representation information for said recommended document to reflect said relocation.

9. The method as recited in claim 7 wherein said feedback solicited includes one of ignoring the change and stop monitoring the recommended document.

10. The method as recited in claim 9 wherein said type of change to said recommended document is a determination that said recommended document has become unavailable; and wherein said action taken is to notify a systems administrator or the user who recommended said document.

11. The method as recited in claim 9 wherein said type of change to said recommended document is a determination that there exist duplicate references to said recommended document, and wherein said action taken is to modify location information for said recommended document in said document representation storage to reflect the multiple references.

12. The method as recited in claim 9 wherein said feedback provided by a user specifies that said recommended document is no longer of interest to the user; in the event no other user in the community of users is subscribed to be notified of changes to said recommended document, said system halting monitoring of changes by said monitoring agent to said recommended document.

13. A method for obtaining evaluations of changes in resources accessible to a community of users of a system, the system including:

resource access circuitry for accessing a set of resources;

user notification data indicating, for each of a subset of the resources, one or more users in the community of users to be notified when a change in a resource in the subset of the resources is detected; and evaluation data indicating user evaluations of resources; the method comprising:
  (a) using the resource access circuitry to automatically attempt to access one of the resources in the subset and to automatically obtain access result data indicating a change to the one of the resources;
  (b) automatically applying a change notification criterion to the access result data to obtain notification data indicating whether to notify users in the community of users that the resource is changed;
  (c) if the notification data indicate that users in the community of users should be notified that the resource is changed, automatically notifying users indicated for the resource by the user notification data that the resource is changed and soliciting users indicated for the resource by the user notification data for evaluations of the resource as changed;
  (d) receiving evaluations of the resource as changed from the notified users; and
  (e) in response to the received evaluations, automatically updating the evaluation data to indicate user evaluations of the resource as changed and providing the received evaluations of the resource as changed to the users in the community of users indicated for the resource by the user notification data.

14. The method of claim 13 in which the resource access circuitry includes a network and the resource is a network-accessible document.

15. The method of claim 14 in which the network is the Internet and (a) comprises:

providing a universal resource location (URL) for the resource over the network.

16. The method of claim 13 in which the access result data indicate whether the resource's location is changed and in which the change notification criterion does not require notification if the only change in the resource is a change in location.

17. The method of claim 16 in which the system further includes location data for the resource and in which, if the access result data indicate that the resource's location is changed, the method further comprises:

updating the location data to indicate the changed location.

18. The method of claim 13 in which the access result data indicate whether the resource's content is changed and in which the change notification criterion requires notification if the resource's content is changed.

19. The method of claim 13 in which the access result data indicate whether the resource is available and in which the change notification criterion does not require notification if the only change in the resource is a change in availability.

20. The method of claim 13 in which the received evaluations provided by a user are made available to other users in the community of users not indicated for the resource by the user notification data upon their accessing the feedback.

* * * * *